(12) United States Patent
Fiedler et al.

(10) Patent No.: US 7,591,080 B2
(45) Date of Patent: Sep. 22, 2009

(54) SECURING DEVICE FOR TRANSPORTING AND MOUNTING A MEASUREMENT INSTRUMENT

(75) Inventors: Karl Fiedler, Siegsdorf (DE); Johann Tauber, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 424 days.

(21) Appl. No.: 11/635,959

(22) Filed: Dec. 8, 2006

(65) Prior Publication Data
US 2007/0157747 A1 Jul. 12, 2007

(30) Foreign Application Priority Data
Dec. 15, 2005 (DE) .................. 10 2005 060 687

(51) Int. Cl.
G01B 11/00 (2006.01)
(52) U.S. Cl. .......................................... 33/706; 33/700
(58) Field of Classification Search ........... 33/706–708, 33/1 PT, 1 M, 700, 702, 703, 705; 356/615–616; 73/886.5, 865.8
See application file for complete search history.

(56) References Cited

U.S. PATENT DOCUMENTS

| | | | | |
|---|---|---|---|---|
| 4,165,564 A | * | 8/1979 | Burkhardt | 33/705 |
| 4,479,304 A | * | 10/1984 | Nelle | 33/700 |
| 4,492,032 A | * | 1/1985 | Nelle | 33/700 |
| 4,554,741 A | * | 11/1985 | Affa | 33/702 |
| 4,559,707 A | * | 12/1985 | Oberhans | 33/702 |
| 6,415,524 B1 | | 7/2002 | Müller et al. | |
| 6,739,067 B2 | * | 5/2004 | Muller | 33/703 |
| 6,761,079 B2 | | 7/2004 | Tondorf et al. | |
| 2002/0124665 A1 | | 9/2002 | Tondorf et al. | |

FOREIGN PATENT DOCUMENTS

DE 199 18 654 A1 10/2000
DE 101 09 909 A1 9/2002

* cited by examiner

Primary Examiner—G. Bradley Bennett
Assistant Examiner—Tania C Courson
(74) Attorney, Agent, or Firm—Brinks Hofer Gilson & Lione

(57) ABSTRACT

A securing system for transporting and mounting a measuring instrument for the determination of a position of two components which are movable in relation to each other. The securing system including a securing device and a support body having a guide track and supporting a linearly extending measuring graduation. The securing device includes a base body, which is longitudinally displaceable along the guide track of the support body and can be fixed in place on the support body by clamping forces in order to maintain the mounting base in a desired position in regard to the support body. The securing device further includes a clamping element pivotably seated on the base body about a pivot axis, which has an eccentric surface, which is embodied to be eccentric with respect to the pivot axis, and that, by pivoting the clamping element, the eccentric surface can be brought into engagement with the support body in such a way that, in the course of pivoting of the clamping element, the base body is fixed in place on the support body and can be brought into a state in which it is displaceably seated on the support body.

36 Claims, 9 Drawing Sheets

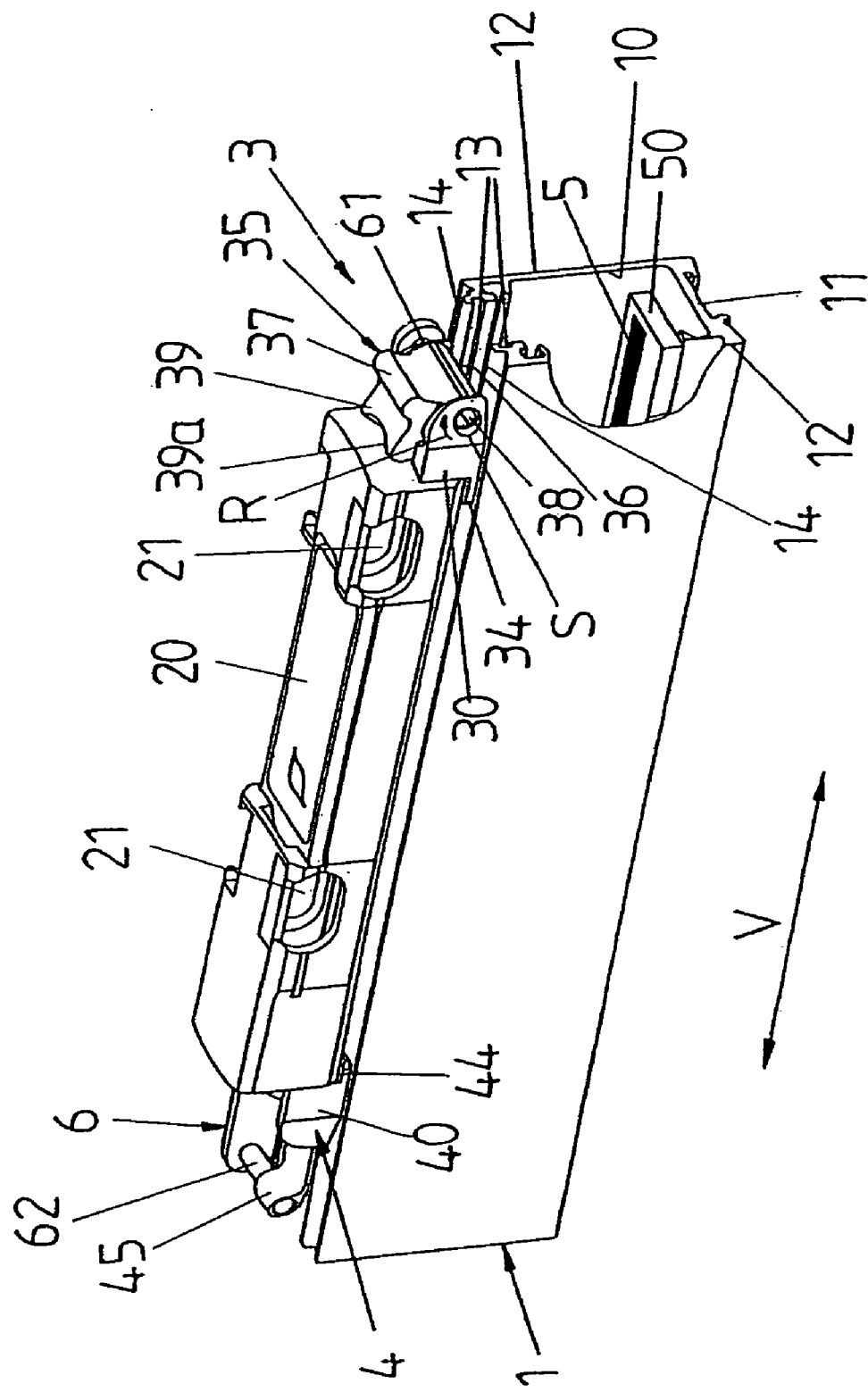

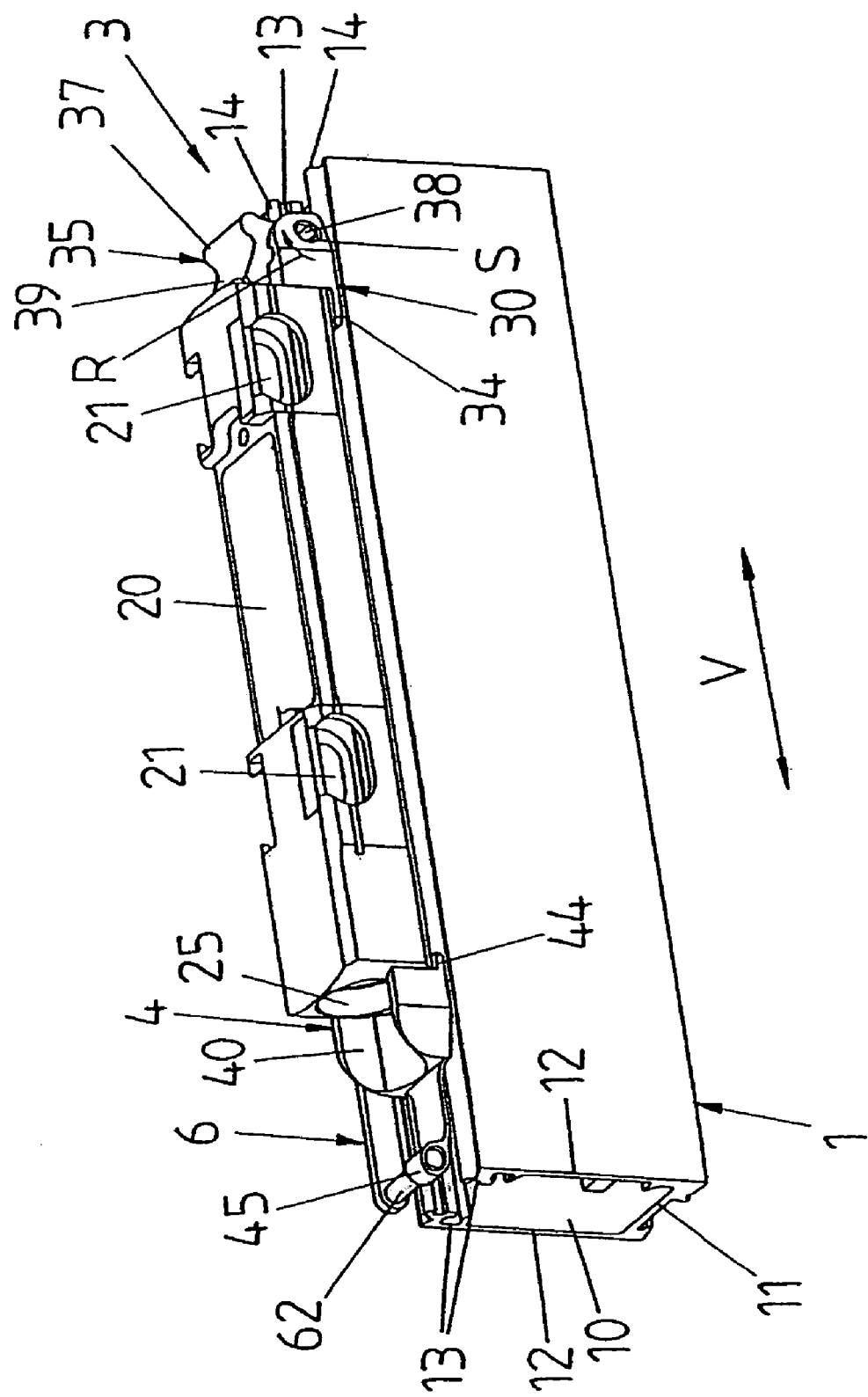

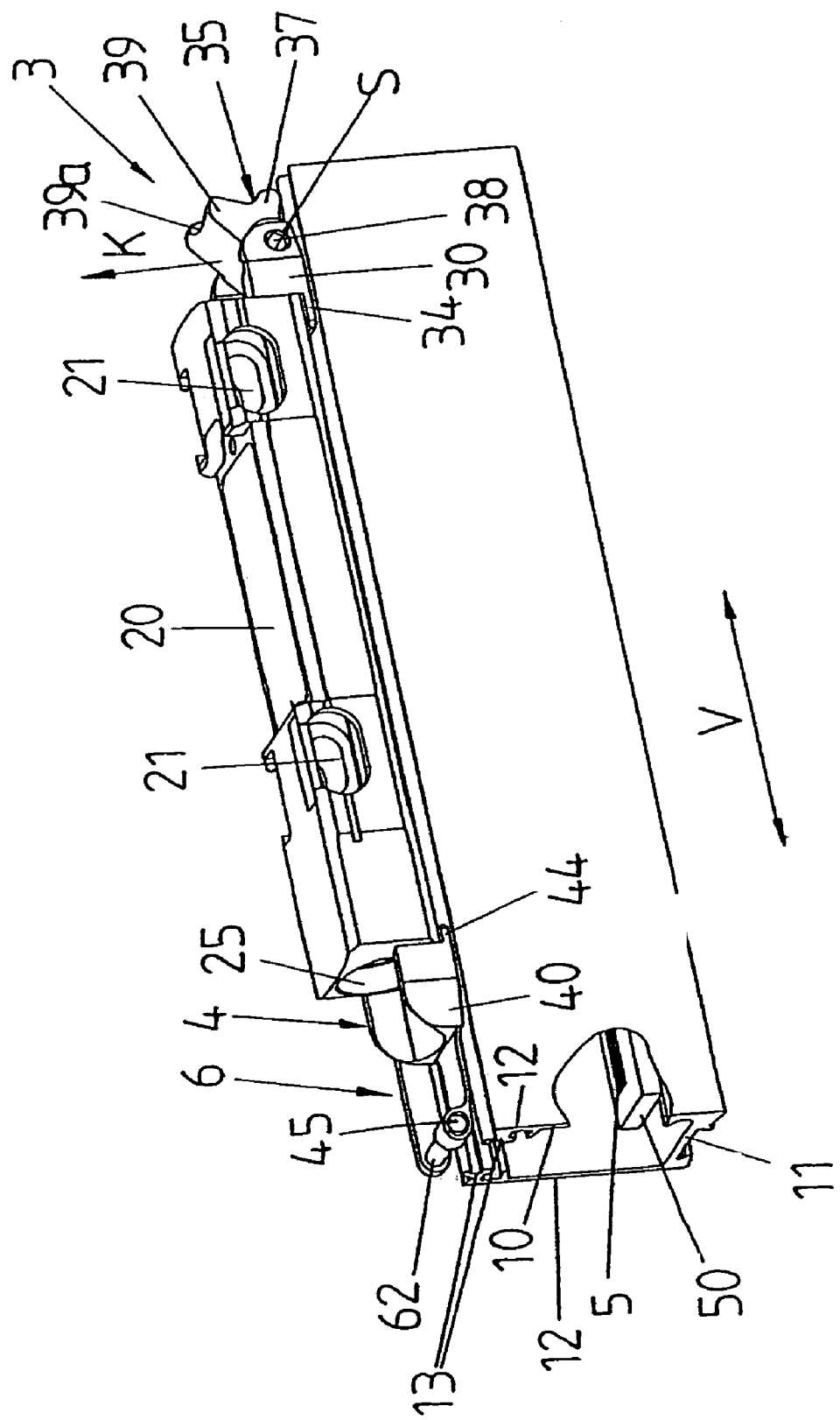

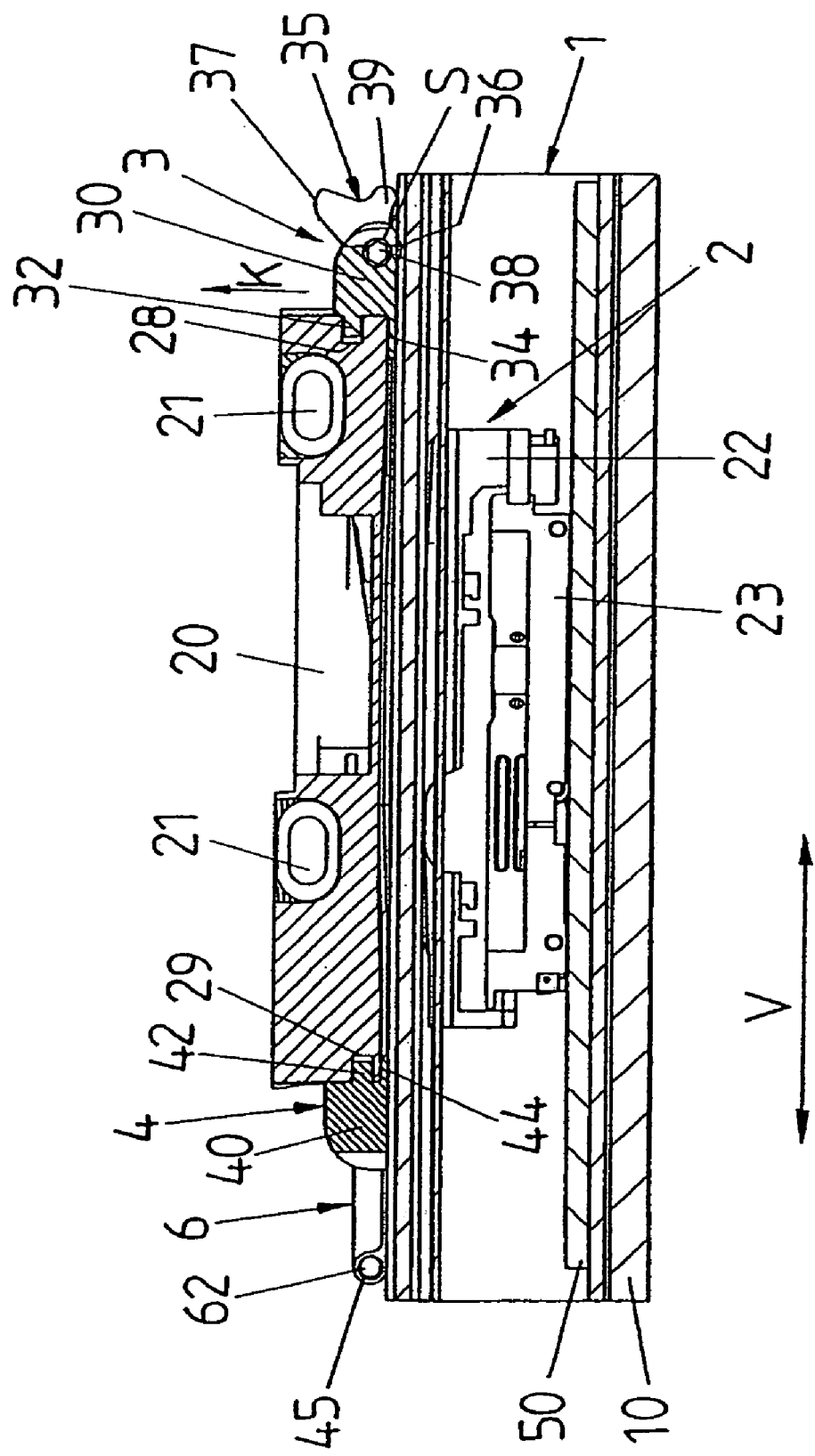

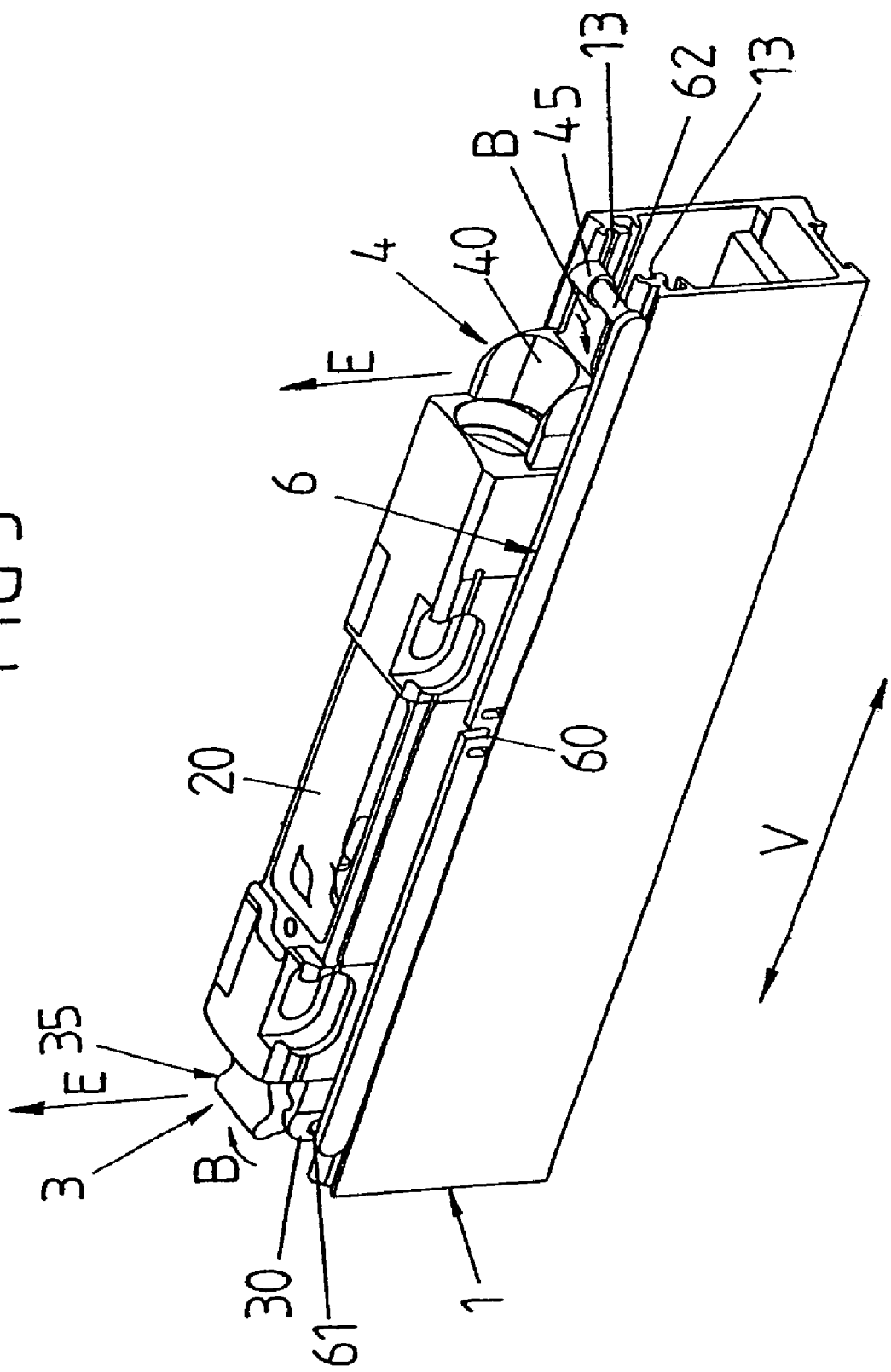

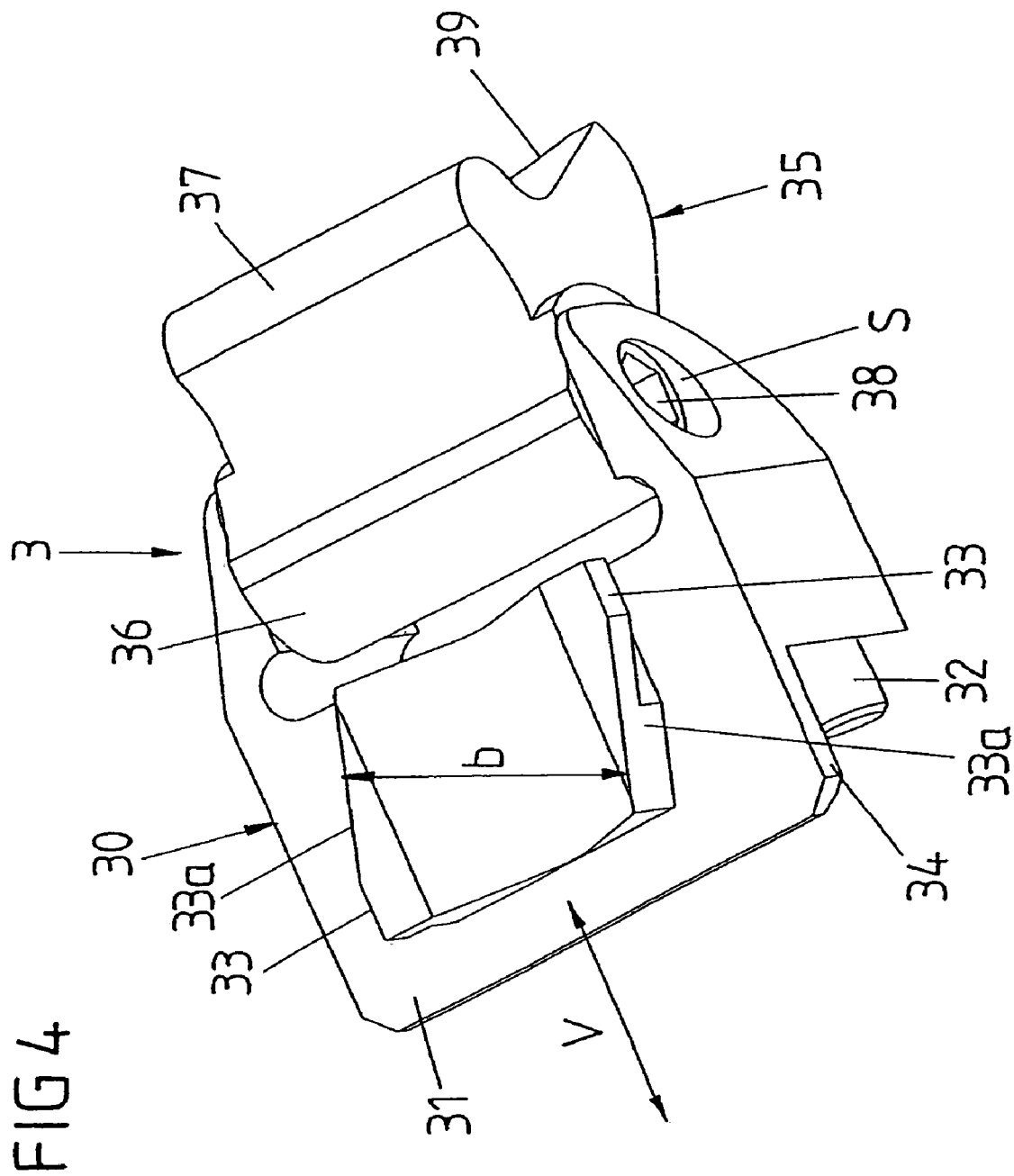

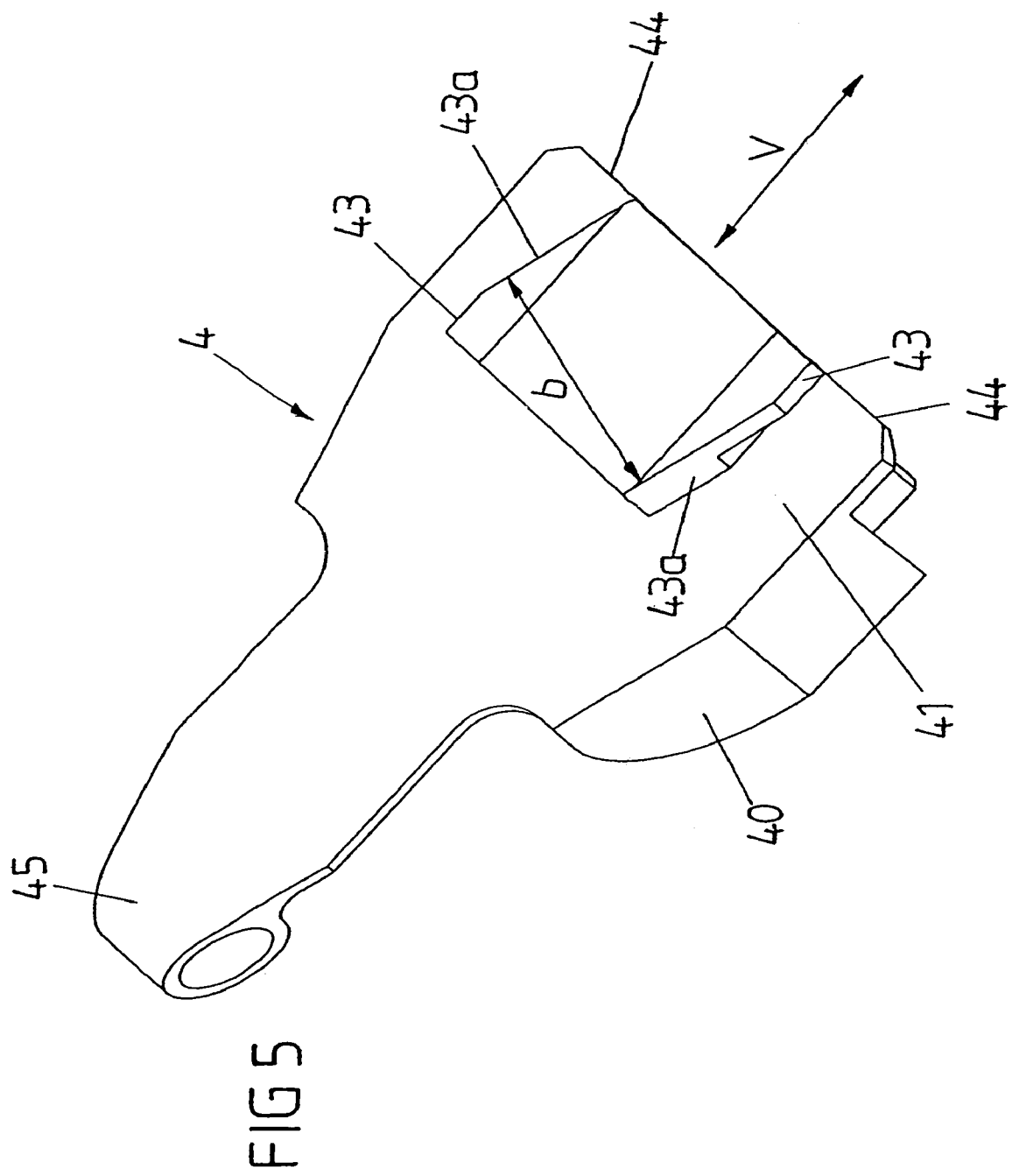

SECURING DEVICE FOR TRANSPORTING AND MOUNTING A MEASUREMENT INSTRUMENT

Applicants claim, under 35 U.S.C. § 119, the benefit of priority of the filing date of Dec. 15, 2005 of a German patent application, copy attached, Serial Number 10 2005 060 687.3, filed on the aforementioned date, the entire contents of which is incorporated herein by reference.

BACKGROUND OF THE INVENTION

1. Field of the Invention

The present invention relates to a securing device for transporting and mounting a measuring instrument for the determination of the position of two components which are movable in relation to each other.

2. Discussion of Related Art

Such a securing device is designed and intended for use with a measuring instrument having a longitudinally-extending measuring graduation, a support body supporting the measuring graduation, a scanning device, which scans the measuring graduation and is guided along a measuring direction at a defined distance from the measuring graduation, as well as a mounting base for fastening the scanning device on one of the two components which are movable with respect to each other. The two components which are movable with respect to each other can be, for example, a carriage and the associated base of a machine tool. The support body with the measuring graduation, on the one hand, and the mounting base with the scanning device on the other are respectively fastened on one of the components of the machine tool.

In this case the securing device is used for fixing the measuring instrument in a defined position (desired position) on the support body of the measuring instrument during transport and during mounting the measuring instrument. To this end the securing device includes a base body, which can be shifted in the longitudinal direction along a guide track of the support body of the securing device extending in the measuring direction (together with the mounting base of the scanning device), and which can be fixed in place on the support body by clamping forces in such a way that it maintains the mounting base in the desired position with respect to the support body.

A securing device for transporting and mounting of a measuring instrument of the type mentioned at the outset is known from DE 199 18 654 A1. This securing device has at least one base body, which can be shifted in the longitudinal direction along a guide track of the support body, as well as a guide element, which is releasably connected with the base body, engages the guide track of the support body in a positive manner and, together with the base body of the securing device, can be clamped in place on the support body of the measuring graduation in order to maintain the mounting base in a defined desired position on the support body during transporting and mounting the measuring instrument. An operating element in the form of an attachment screw is used for introducing the clamping forces, by which the securing device can be clamped in place on the support body of the measuring graduation. Its screw head is arranged on the face of the base body of the securing device facing away from the support body and is intended to be operated by a tool.

In connection with a securing device of the type mentioned, known from DE 101 09 909 A1, it has been provided for making the accessibility of the operating element used for releasing the securing device easier after the measuring instrument has been installed in a machine tool in that an actuating section of the operating element (for example an attachment screw) projects laterally past the lateral edge of the base body of the securing device at least at a time when the base body has been clamped in place on the support body, so that the actuating section of the operating element can be operated at the side of the base body for introducing and/or releasing the clamping force.

It can be seen that different designs, as well as different installation situations, of a measuring instrument in a machine tool can lead to different conditions under which the securing device has to be removed from the measuring instrument after it has been installed in it in order to allow the shifting of the scanning device together with the mounting base along the support body supporting the measuring graduation in the course of operating the measuring instrument.

OBJECTS AND SUMMARY OF THE INVENTION

It is therefore an object of the present invention to create a securing device for transporting and mounting a measuring instrument of the type mentioned at the outset which, in a simple manner, makes possible the provision of a clamped connection for arresting the mounting base in a desired position, as well as the release of the clamped connection after the installation of the measuring instrument in accordance with the requirements.

This object is attained in accordance with a securing system for transporting and mounting a measuring instrument for the determination of a position of two components which are movable in relation to each other. The securing system including a securing device and a support body having a guide track and supporting a linearly extending measuring graduation. The securing device includes a base body, which is longitudinally displaceable along the guide track of the support body and can be fixed in place on the support body by clamping forces in order to maintain the mounting base in a desired position in regard to the support body. The securing device further includes a clamping element pivotably seated on the base body about a pivot axis, which has an eccentric surface, which is embodied to be eccentric with respect to the pivot axis, and that, by pivoting the clamping element, the eccentric surface can be brought into engagement with the support body in such a way that, in the course of pivoting of the clamping element, the base body is fixed in place on the support body and can be brought into a state in which it is displaceably seated on the support body.

Accordingly, a clamping element is pivotably seated on the base body (which can be shifted on a guide track on the support body of the measuring instrument), which has an eccentric surface extending eccentrically with respect to its pivot axis and which can be brought into and out of contact with the support body by pivoting the clamping element as a function of its pivoting direction, so that, depending on the pivoted position of the clamping element, the base body is fixed in place on the support element or is seated on it so it can be shifted along it.

In fact, it can be provided that the base body of the securing device is fixed in place (clamped in place) on the support body of the measuring instrument at the time the clamping element has been pivoted into a position in which the eccentric surface of the clamping element is in engagement with the support body and presses against it. In the other way, the base body of the securing device is seated on the support body of the measuring instrument at the time the clamping element has been pivoted into a position in which the eccentric surface is out of engagement with the support body. On the one hand, "being out of engagement" then can mean that the eccentric surface of the clamping element is spaced apart from the support body of the measuring instrument, i.e. does not touch it, on the other hand, the eccentric surface of the clamping element can, in the state where it is out of engagement, also (loosely) touch it, but without generating a clamping force which would impede the shifting of the base body of the securing device along the support body.

In this case, an eccentric surface of the pivotably seated clamping element is understood to be a surface having such a geometry (eccentric with respect to the pivot axis) that, when pivoting the clamping element, the spacing between the eccentric surface and an assigned section of the support body of the measuring instrument is varied, so that the eccentric surface can be brought into and out of engagement with that section in this way.

When the clamping element is in engagement via its eccentric surface with the support body of the measuring instrument, the clamping element exerts such a force on the support body via the eccentric surface that, based on the reaction force (counterforce) generated by this, the base body of the securing device is clamped against the support body, in particular against the edge of the associated guide track, and in this way is clamped against the support body.

The attainment of the object in accordance with the present invention has the advantage that, by tilting the clamping element, for example by an angle of 90° wherein, depending on the pivot direction, the clamping element is brought into or out of engagement with the support body of the measuring instrument, it makes possible the arrestment, or release, of the securing device in a simple manner in order to fix the mounting base on the support body of the measuring instrument, or to seat it so it can be shifted. In this case the mounting base can be fixed in place on the support body in any arbitrary position, viewed along the shifting direction of the mounting body or the extension direction of the measuring graduation on the support body (measuring direction).

In connection with this, it is easily possible to provide an actuating section at the pivotably seated clamping element for manually pivoting the clamping element, and/or an actuating section for pivoting the clamping element by a tool. Flexible manipulation of the clamping element under various installation conditions of the measuring instrument is made possible by this. In this case the actuating section to be operated by a tool, which can for example be an interior or exterior multi-cornered device, is preferably arranged in such a way that the tool intended for actuating the clamping element can be brought into engagement with the actuating section along a direction extending transversely to the shifting direction of the base body of the securing device, i.e. along a direction extending transversely to the guide track of the support body.

Since a securing device for producing a clamping force which is based on the eccentric principle can be embodied to be very compact, such a securing device is also particularly suited for very short measuring instruments, as well as those having a narrow profile.

By a clamping element with an eccentric surface, it is moreover possible to easily generate such large clamping forces that a single base body with an associated clamping element, which is arranged at an end face of the mounting base, is sufficient for fixing the mounting base in place on the support body.

In this connection it should be noted that a plug-in connection which can be easily produced and released is particularly advantageous for connecting the base body of the securing device (on which the clamping element is pivotably seated) with the mounting base. By generating the clamping forces with which the base body of the securing device is fixed in place at any arbitrary, pre-selectable position on the support body of the measuring instrument, it is simultaneously possible to clamp the plug-in elements used for providing the plug-in connection, for example plug-in pins on the one hand, and associated plug-in openings, on the other, in such a way against each other that in the clamped state the plug-in connection can essentially not be released. It is assured by this that when clamping the base body of the securing device in place on the support body (by pivoting the clamping element into a suitable position), the base body of the securing device also simultaneously is firmly clamped together with the mounting base of the measuring instrument. It is achieved by this that clamping the base body of the securing device against the support body of the measuring instrument causes a secure fixation in place, or fixation of the mounting base in the appropriate position on the support body. It is therefore not necessary to provide a further base body of the securing device with an associated clamping element, for example as a buttressing device for the corresponding components of the securing device on the first end face of the mounting base, on the opposite, second end face.

However, the attainment of the object in accordance with the present invention can also be realized in the way in which a base body of the securing device with an associated clamping element having an eccentric surface is arranged on each one of the two end faces of the mounting base.

In the case where a base body of the securing device with an associated clamping element is arranged only at one end face of the mounting base, the other end face can be used without restriction as a cable outlet, even for a cable extending from the cable outlet which had already been pre-installed prior to the installation of the measuring instrument in a machine tool.

It is furthermore possible to arrange a guide element on the free end face of the mounting base not occupied by components of the securing device, which is preferably guided on the same guide track as the base body of the components of the securing device arranged on the first end face of the mounting base, and which advantageously has a pulling device with which it can be pulled off the mounting base when required.

In accordance with an embodiment of this present invention variation, a coupling element is provided, by which the securing device and the guide element are connected in such a way that, in case of shifting of the mounting base, they are always moved together with the mounting base. The coupling element is releasably connected, for example, via respective plug connections, with the securing device on the one side and the guide element on the other, so that the coupling element can easily be removed when it is intended to remove the securing device and the guide element from the support body of the measuring instrument.

In a preferred further development of the present invention the at least one base body to be arranged on the mounting base is designed in such a way that in the unlocked state, i.e. in a position of the clamping element in which the base body is not clamped to the support body of the measuring instrument, it can be brought out of engagement with the guide track by a movement with a component perpendicularly to the extension direction of the guide track, so that thereafter the base body, together with the clamping element, can be taken out of the guide track by a movement along a second direction perpendicularly to the extension direction of the guide track.

For example, this can be achieved in that the guide elements, by which the base body of the securing device is guided longitudinally displaceable in the guide track of the support body (for example constituted by two parallel extending longitudinal grooves), are beveled at their exteriors.

This aspect of the present invention can be used and realized in connection with differently designed base bodies for a securing device, which can be shifted along a guide track of a support body for a securing device of a measuring instrument, regardless of whether in accordance with the present invention the base body can be fixed in place on the support body by a clamping element having an eccentric surface, or in any other manner known, for example, in accordance with DE 199 18 654 A1 or DE 101 09 909 A1.

Further details and advantages of the present invention will become apparent in the course of the following description of an exemplary embodiment by the drawings.

BRIEF DESCRIPTION OF THE DRAWINGS

FIG. 1a is a perspective view of a first embodiment of a measuring instrument with a securing device for maintaining a mounting base of the measuring instrument in a defined desired position, this in the unlocked state of the securing device in accordance with the present invention;

FIG. 1b is a second perspective view of the measuring instrument in accordance with FIG. 1a;

FIG. 1c is a longitudinal sectional view through the measuring instrument of FIG. 1a;

FIG. 2b is a second perspective view of the measuring instrument of FIG. 1a in the locked state of the securing device;

FIG. 2c is a longitudinal sectional view through the measuring instrument of FIG. 2a;

FIG. 3 is a rear perspective view of the measuring instrument of FIGS. 1a to 1c;

FIG. 4 is a perspective plan view of the underside of the securing device in FIGS. 1a to 2c facing the support body of the measuring instrument of FIGS. 1-3; and FIG. 5 is a perspective plan view of the underside of an embodiment of a guide element complementing the securing device of FIG. 1a facing the support body of the measuring instrument.

DETAILED DESCRIPTION OF THE PREFERRED EMBODIMENTS

Figure 1C:
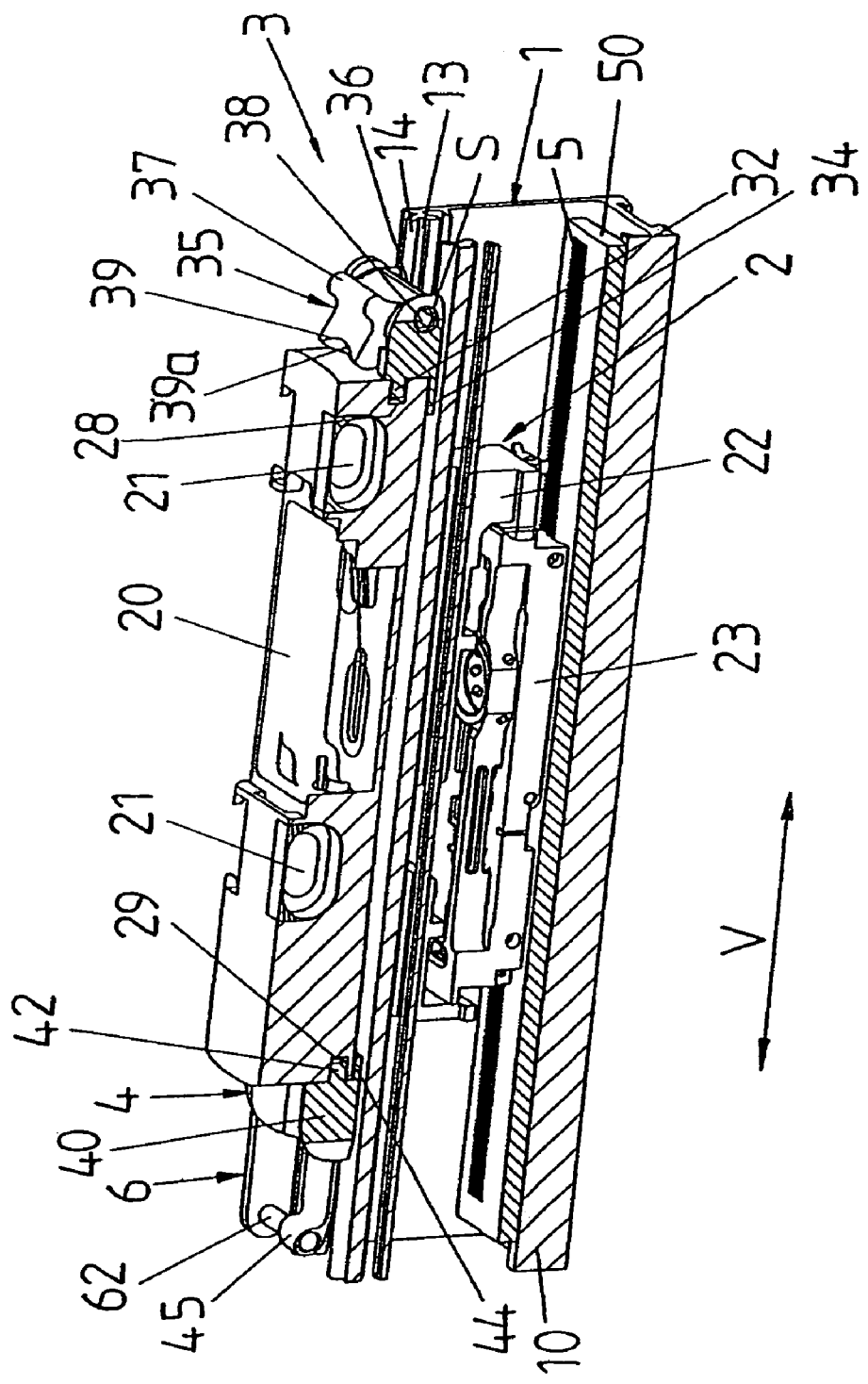

A measuring instrument for determining the position of two components of a machine tool, which can be moved relative to each other, is represented in FIGS. 1a to 1c, and includes a support body 1, a scanning device 2 and a securing device 3, by which the scanning device 2 can be maintained in a defined desired position on the support body 1. The support body 1 and the securing device 2 constitute a securing system for transporting and mounting the measuring instrument.

In accordance with FIGS. 1a to 1c, the support body 1 includes a longitudinally extending hollow profiled element 10 with a base 11, from which two lateral legs 12 extend substantially vertically. This hollow profiled element 10 encloses an interior hollow space, in which a measuring graduation 5 extending in a measuring direction is arranged. Customarily the hollow profiled element is provided with lateral closing elements on its two end faces and has mounting locations, not visible in the drawings, for fastening the support body 1 on a machine component, for example a carriage of a machine tool.

The scanning cart 23 of a scanning device 2 is arranged in a displaceable manner inside the hollow profiled element 10 and has a measuring head for scanning the optical measuring graduation 5 and which can be equipped, for example, with a light source, a lens system and associated photo elements. The scanning cart 23 is seated, displaceable along a displacement direction V, which coincides with the measuring direction, i.e. the direction of extension of the measuring graduation of the support body 1 (for example on the scale 50 of the measuring instrument supporting the measuring graduation 5). Furthermore, the scanning cart 23 is connected, at least rigidly along the displacement direction V, via a carrier 22 with a mounting base 20, which is arranged outside the hollow chamber enclosed by the hollow profiled element 10 and is used for fastening the scanning device 2 on a second machine component, for example the bed of the above mentioned machine tool. The mounting base 20 has appropriate fastening openings 21 for this purpose.

A measuring instrument of the above described type, with which a longitudinal measurement can be performed for determining the position of two machine components with respect to each other, is generally known and therefore need not be described in greater detail here.

It can furthermore be seen from FIGS. 1a to 1c that a securing device 3 is assigned to the measuring instrument and is connected with the mounting base 20. This securing device 3 includes a base body 30, which is arranged on one of the two end faces of the mounting base 20 which are spaced apart from each other along the displacement direction V, and is provided with plug-in elements 32 in the form of pegs or pins, which engage associated recesses or openings 28 of the mounting base 20 for forming a plug-in connection.

In accordance with FIG. 4, the base body 30 of the securing device 3 has guide elements 33, which are formed on the underside 31 of the base body 30 of the securing device 3 (facing the support body 1) and are guided, longitudinally displaceable, in a guide track 13, formed by two longitudinal grooves, of the support body 1, wherein the longitudinal grooves extend in the displacement direction V at the free end of each one of the lateral legs 12 of the support body 1. Furthermore, the base body 30 of the securing device 3 has at least one tongue 34, which extends underneath the mounting base 20 and in this way determines the distance of the mounting base 20 from the support body 1 transversely with respect to the displacement direction V.

The guide track 13 of the support body 1, constituted by two longitudinally extending grooves located opposite each other transversely with respect to the displacement direction V, is delimited toward the top, i.e. at the free ends of the oppositely located lateral legs 12, by a protrusion 14, which extends over the guide elements 33 of the base body 30 of the securing device 3.

As a result, the base body 30 of the securing device 3 is seated on the guide track 13 of the support body 1 and can be longitudinally moved in the displacement direction V of the mounting base 20 and, together with the scanning device 2 and the mounting base 20, can be shifted in the displacement direction V into a defined, pre-selectable desired position on the support body 1.

For making the displacement movement easier and for the dependable guidance of the mounting base 20 in the course of the displacement movement, as well as for the subsequent defined fixation in place of the securing device on the support body 1, a guide element 4 is arranged on the end face of the mounting base facing away in the displacement direction V from the base body 30 of the securing device 3, whose base body 40 is shaped in a shell fashion in such a way that a cable outlet 25 provided at that end face of the mounting base 20 is not blocked, i.e. a connecting cable can project from the cable outlet 25. Moreover, the guide element 4 has at least one tongue 44, with which it extends underneath the mounting base 20, corresponding to the tongues 34 of the base body 30 of the securing device, and in this manner determines the distance of the mounting base 20 from the support body 1 transversely with respect to the displacement direction V. In this case the at least one tongue 34 of the base body 30 of the securing device 3, on the one hand, and the at least one tongue 44 of the base body 40 of the guide element 4, on the other, are designed and arranged here in such a way that a uniform distance between the mounting base 20 and the support body 1 is advantageously assured along the length of the mounting base 20.

For connecting the guide element 4 with the associated end face of the mounting base 20 provided with the cable outlet 25, plug elements 42 in the form of plug-in pins or plug-in pegs project away from the base body 40 of the guide element 4 and engage associated plug-in openings 29 of the mounting base in the form of plug openings.

Furthermore, a pulling device 45 projects away from the guide element 4 along the displacement direction V, by which the guide element 4 can be pulled off the mounting base 20 when required, releasing the plug connection 42, 29.

By the view from behind of the arrangement of FIGS. 1a to 1c represented in FIG. 3 it becomes clear that the securing device 3 and the guide element 4 are coupled with each other via a coupling element 6 in the form of a connecting rod, which extends parallel with the mounting base 20 from its one end face provided with the securing device 3 to the other end face provided with the guide element 4. On both its ends the coupling element 6 has respective plug elements 61 or 62 in the form of a peg or plug pin, of which the one plug element 61 has been plugged into a lateral opening of the base body 30 of the securing element 3, which can be an access to an engagement area for a tool, such as will be described in greater detail in what follows, and the other plug element 62 of which is inserted into an eye formed at the end of the pulling device 45. In its center area, in the displacement direction V, the coupling element has a deformation area 60 in the form of a meander-like expansion element, used for tolerance compensation, by which it is possible to correct mounting tolerances.

A mutual displaceability of the securing device 3 and the guide element 4 in the course of a longitudinal movement of the mounting body 20 in the displacement direction V is assured by the coupling element 6.

If, prior to the installation of the measuring instrument in a machine tool, the mounting base 20, together with the base body 30 of the securing device 3 arranged at one end face of the mounting base 20, and the guide element 4 arranged at the other end face of the mounting base 20, has been shifted into a desired position on the support body 1, which is to be maintained in the course of the installation of the measuring instrument in a machine tool, the mounting base 20, and therefore also the scanning cart 23 of the scanning device 2, can be fixed in this desired position by the securing device 3. For this purpose, a clamping element 35 is pivotably hinged around a pivot axis S extending transversely with respect to the displacement direction V on the base body 30 of the securing device 3.

The clamping element 35 has an eccentric surface 36, i.e. an outer surface which is eccentrically shaped with respect to the pivot axis S which, in the unlocked state of the securing device 3 represented in FIGS. 1a to 1c, which allows the displacement of the mounting base 20 along the displacement direction V, is spaced apart from the support body 1, in particular does not rest against the protrusions 14 which extend over the longitudinal grooves constituting the guide track 13.

Figure 2A:
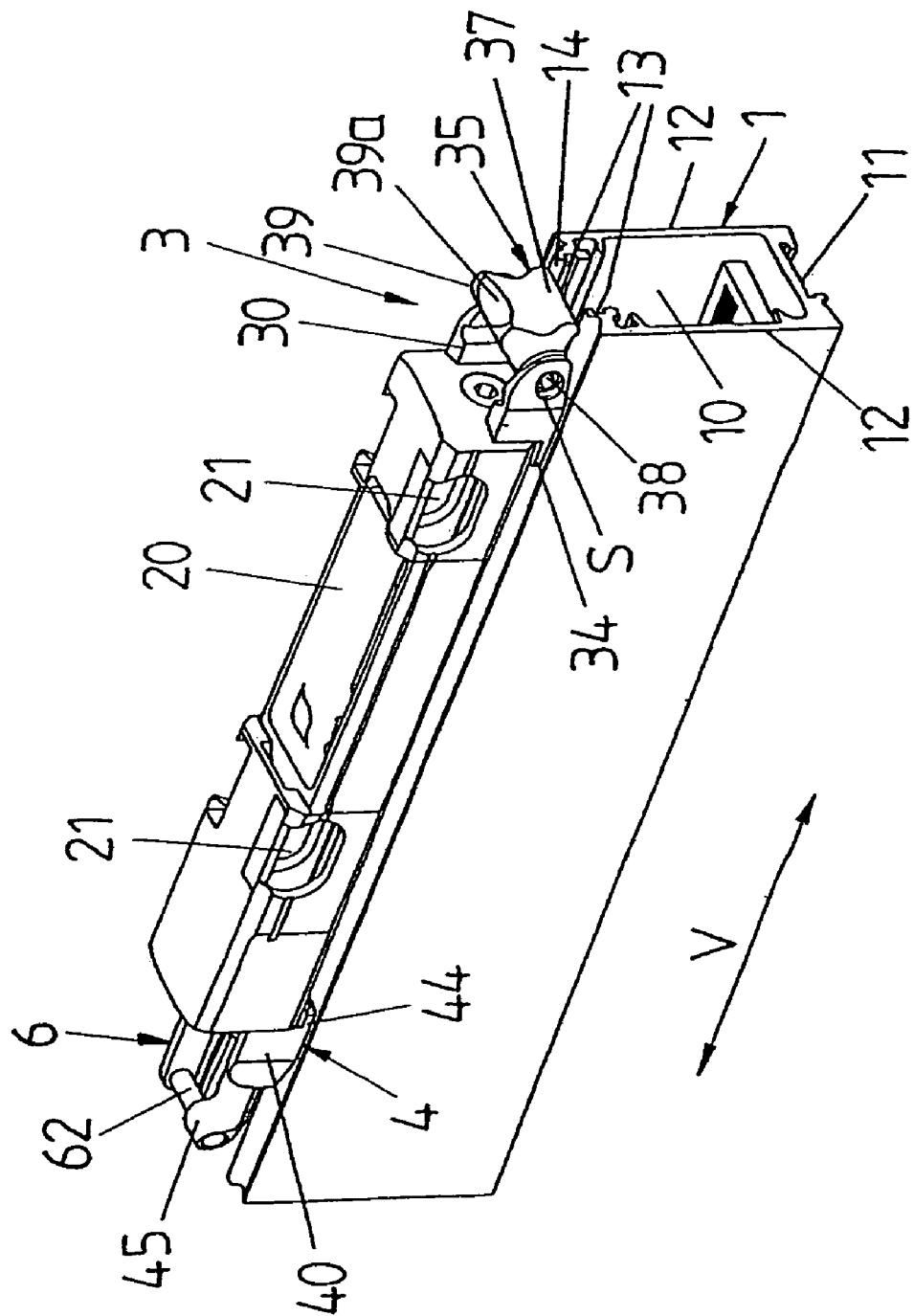
FIG. 2a is a perspective view of the measuring instrument of FIG. 1a in the locked state of the securing device.

The pivotably seated clamping element 35 has an actuating section 37 in the form of an elevation, which allows the manual pivoting of the clamping element 35 along the pivoting direction R, indicated by an arrow in FIGS. 1a to 1c, by approximately 90° (in a clockwise direction). In the course of this, the eccentric surface 36 of the clamping element 35 comes into engagement with the support body 1, more exactly with the two protrusions 14 extending respectively along a lateral leg 12 of the support body 1 which delimit the longitudinal grooves, in such a way that the clamping element 35 exerts a pressure force on the support body 1, see FIGS. 2a to 2c. Because of the reaction force, or counterforce, connected with this, the base body 30 of the securing device 3 is clamped along a clamping direction K, perpendicularly with respect to the displacement direction V, against the protrusions 14 of the support body 1 which upwardly delimit the guide track 13, and in this way is clamped against the support body 1. At the same time, because of the clamping forces acting on the base body 30 of the securing device 3, its plug-in elements 32 in the form of plug pins or pegs are clamped in the associated plug openings 28 of the mounting base 20.

As a result, the base body 30 of the security device 3 is therefore fixed in a defined position, viewed in the displacement direction V, on the support body 1 in that the guide elements 33 of the base body 30 are clamped in the guide track 13 of the support body 1 by the effect of the clamping forces K. Furthermore, by the clamping of the plug-in elements 32 (pins) of the base body 30 in the assigned plug openings 28 of the mounting base 20, the plug connection 28, 32 between the mounting base 20 and the base body 30 of the securing device 3 is secure against being undone. Therefore the mounting base 20 is fixed in place on the support body 1 in the previously assumed desired position by the base body 30 of the securing device 3.

Following the installation of the measuring instrument, i.e. the support body 1 together with the scanning device 2, in a machine tool, wherein the scanning device 2 together with the mounting base 20 was held in a defined position in the described manner by the securing device 3, the securing device 3 can now again be unlocked in order to make possible the longitudinal movement of the scanning device 2 in the displacement direction V along the support body 1 required in the course of operation of the measuring instrument.

For this purpose the coupling element 6 is released from the securing device 3 and the guide element 4, and the clamping element 35 is again pivoted in a counterclockwise direction into the initial position represented in FIGS. 1a to 1c, in which the eccentric surface 36 of the clamping element 35 is spaced apart from the support body 1, and therefore does not exert any pressure forces on the support body 1 which would lead to the clamping of the base body 30 of the securing device 3 in the guide track 13.

This pivoting of the clamping element 35 for unlocking the securing device 3 need not only take place by the manual actuation of the clamping element 35 on the actuating section 37 shaped as an elevation, but also by actuating the clamping element by a tool. For this purpose an actuating section 38 in the form of an interior multi-cornered device has been formed on the clamping element 35 in the area of the pivot axis S in such a way that, with its actuating head, a suitable tool can be introduced laterally, namely transversely with respect to the displacement direction V, into the actuating section 38 embodied as an interior multi-cornered device. Therefore the clamping element 35 can also be pivoted by the rotation of a tool introduced into the actuating section 38 embodied as an interior multi-cornered device in order to bring the clamping element 35 selectively into the pivoted position in which its eccentric surface 36 is spaced apart from the support body 1, or into a position in which the eccentric surface 36 is in engagement with the support body. This is of importance in particular in case the securing device 3 is to be unlocked following the installation of the measuring instrument 1, 2 in a machine tool. Depending on the installation conditions, in individual cases the components of the securing device 3 could be difficult to access for unlocking. In that case the clamping element 35 can be selectively actuated manually at the elevation 37, or actuated by means of a tool laterally introduced in the interior multi-cornered device 38, depending on which type of actuation can be advantageously performed under the given circumstances.

Following the pivoting back of the clamping element 35 into the initial position represented in FIGS. 1a to 1c, in which the eccentric surface is not in engagement with the support body 1, the clamping of the plug connection 28, 32 of the base body 30 of the securing device 3 with the mounting body 20 is also released, so that the base body 30 can be removed along the displacement direction V from the mounting base 20, while releasing the plug connection 28, 32.

In the course of pivoting back the clamping element 35 (in a counterclockwise direction) into the initial position represented in FIGS. 1a to 1c, the clamping element 35 can be pivoted far enough so that a protrusion 39 provided on the clamping element 35 comes into contact with, or touches, the associated end face of the mounting base 20. By this a push-back force is exerted in the displacement direction V, which can contribute to cancelling possible twisting of the securing device 3 with respect to the mounting base 20, which otherwise would prevent the removal of the securing device 3 from the mounting base 20. Thus, the protrusion 39 is used for pushing the securing device 3 away from the mounting base 20 during the pivoting of the clamping element 35 into a pivot position in which the eccentric surface 36 is out of engagement with the support body 1.

The end section 39a of the protrusion 39, which can be brought into contact with the associated end face of the mounting base 20, is designed in the shape of a trough, so that a cable can be conducted past the protrusion 39 of the clamping element 35, which permits the arrangement of the securing device 3 also in front of the end face of the mounting base 20 provided with a cable outlet 25.

Thereafter, the base body 30, together with the clamping element 35, can either be pulled off along the displacement direction V from the support body 1, or can alternatively be removed perpendicularly with respect to the displacement direction V from the support body 1.

The last mentioned step entails having the guide elements 33 of the base body 30 of the securing device 3 brought out of engagement with the longitudinal grooves constituting the guide track 13. For this purpose the guide elements 33 provided on the underside 31 of the base body 30 of the securing device 3 have beveled lateral edges 33a (flanks), see FIG. 4. As a result, the guide elements 33 of the base body 30 can be brought out of engagement with the longitudinal grooves (i.e. the guide track) by a pivot movement in the plane defined by the longitudinal grooves of the guide track 13. Thereafter the base body 30, together with the clamping element 35, can be lifted perpendicularly with respect to the displacement direction V (and perpendicularly to the described tilt plane) from the support body 1, wherein the guide elements 33 of the base body 30 pivoted out of the associated longitudinal grooves 12 are removed from the hollow profiled element 10 of the support body 1.

The pivot movement of the base body 30 of the securing device 3 in the plane defined by the longitudinal grooves of the guide track 13 required for this corresponds to the angle of inclination of the oblique edges 33a (flanks) with respect to the displacement direction V. A corresponding pivot movement B of the base body 30 and of the clamping element 35 of the securing device 3 in the plane defined by the longitudinal grooves of the guide track 13 is indicated by means of an arrow in FIG. 3. Because of this pivot movement the lateral edges 33a (flanks) of the guide elements 33, which initially extended obliquely with respect to the displacement direction V, assume an orientation in which they extend parallel with respect to the displacement direction V. The distance b between the two beveled edges 33a extending parallel with respect to each other of the guide elements 33 has been selected such that it is slightly less than the distance transversely with respect to the displacement direction between the two longitudinal grooves constituting the guide track 13. This makes possible the subsequent removal of the base body 30 of the securing device 3, together with the clamping element 35, along the removal direction E represented in FIG. 3 perpendicularly with respect to the plane defined by the longitudinal grooves of the guide track 13. Thus, the removal direction E forms a normal line on the plane in which the base body 30 and the clamping element 35 of the securing device 3 are pivoted in order to be able to bring the guide elements 33 out of engagement with the longitudinal grooves of the guide track 13 and to lift the base body 30, together with the clamping element 35, off the support body 1 along this removal direction E.

This design of a base body 30 of a securing device 3 for a mounting base 20 of a measuring instrument 1, 2 is advantageous and usable regardless of whether the locking and unlocking of the securing device 3 takes place, as here, by pivoting a clamping element 35 provided with an eccentric surface 36. It can also be employed in connection with securing devices operating in accordance with different technical principles.

In a corresponding manner it is possible to pull off the guide element 4 from the other end face of the mounting base 2 in one way by bringing the plug elements 42 on the guide element side out of engagement with the plug-in openings 29 on the side of the mounting base along the displacement direction V, for example by exerting a pulling force on the pulling means 45. Thereafter, the guide element 4 can be pulled off the support body 1 along the displacement direction V. It is alternatively also possible in accordance with FIG. 5 for the guide elements 43 provided on the underside 41 of the guide element 4, which engage the longitudinal grooves of the guide track 13, to have lateral edges 43 (flanks) extending at a definite distance b parallel with respect to each other which are beveled in such a way that the guide elements 43 come out of engagement with the longitudinal grooves of the guide track 13 by pivoting the guide element 4 in the plane defined by the longitudinal grooves 13, and the guide element 4 can be lifted off perpendicularly with respect to the displacement direction V. In this case the required pivot angle of the guide element 4 in the plane defined by the guide track 13, i.e. by the two longitudinal grooves which extend parallel with respect to each other and constitute the guide track 13, corresponds to the inclination of the beveled lateral edges 43a (flanks) of the guide elements 43 with respect to the displacement direction V.

A corresponding pivot movement B of the guide element 4 in the plane defined by the longitudinal grooves of the guide track 13 is indicated by an arrow in FIG. 3, the same as the removal direction E extending perpendicularly with respect to that plane, along which the guide element 4 can be removed from the guide track 13 constituted by the longitudinal grooves. Stated in other words, the removal direction E of the guide element 4 forms a normal line on the plane in which the pivot movement B takes place, by which the guide element 4 can be brought out of engagement with the guide track 13.

The foregoing description is provided to illustrate the present invention, and is not to be construed as a limitation. Numerous additions, substitutions and other changes can be made to the present invention without departing from its scope as set forth in the appended claims.

We claim:

1. A securing system for transporting and mounting a measuring instrument for the determination of a position of two components which are movable in relation to each other, the securing system comprising:
    a support body comprising a guide track and supporting a linearly extending measuring graduation; and
    a securing device comprising:
        a base body, which is longitudinally displaceable along said guide track of said support body and can be fixed in place on said support body by clamping forces in order to maintain said mounting base in a desired position in regard to said support body; and
        a clamping element pivotably seated on said base body about a pivot axis, which has an eccentric surface, which is embodied to be eccentric with respect to said pivot axis, and that, by pivoting said clamping element, said eccentric surface can be brought into engagement with said support body in such a way that, in the course of pivoting of said clamping element, said base body is fixed in place on said support body and can be brought into a state in which it is displaceably seated on said support body.

2. The securing system in accordance with claim 1, wherein said base body is clamped in place on said support body when said clamping element has been pivoted into a position in which said eccentric surface of said clamping element is in engagement with said support body, wherein said eccentric surface of said clamping element presses against said support body in such a way that said base body is clamped in place against said support body as a result of reaction forces connected with such pressing.

3. The securing system in accordance with claim 1, wherein said base body can be shifted along said support body when said clamping element has been pivoted into a position in which said eccentric surface of said clamping element is out of engagement with said support body.

4. The securing system in accordance with claim 1, wherein upon action of said eccentric surface of said clamping element on said support body, said securing device can be clamped against said support body in such a way that said base body is clamped in place on said support body.

5. The securing system in accordance with claim 4, wherein said base body can be clamped against a protrusion delimiting said guide track.

6. The securing system in accordance with claim 1, wherein said guide track is constituted by at least one guide groove.

7. The securing system in accordance with claim 1, wherein said base body has at least one guide element conducted in said guide track, which can be clamped in place against a protrusion delimiting said guide track.

8. The securing system in accordance with claim 1, wherein said securing device comprises exactly one base body, which is to be arranged on one of two end faces of a mounting base for fastening a scanning device that scans said measuring graduation and which is movably guided along said measuring graduation, said two end faces are spaced apart from each other in said displacement direction.

9. The securing system in accordance with claim 8, further comprising a guide element arranged on another of said two end faces of said mounting base, which is guided in said guide track of said support body and which can be moved, together with said mounting base, along said displacement direction.

10. The securing system in accordance with claim 9, wherein said guide element is releasably connected with said mounting base.

11. The securing system in accordance with claim 10, wherein said guide element is connected with said mounting base via a plug-in connection.

12. The securing system in accordance with claim 9, further comprising a pulling device arranged on said guide element in such a way that said guide element can be released from said mounting base by exerting a pulling force on the pulling device.

13. The securing system in accordance with claim 1, wherein said base body is releasably connected with a mounting base for fastening a scanning device that scans said measuring graduation and which is movably guided along said measuring graduation.

14. The securing system in accordance with claim 13, wherein said base body is connected with said mounting base by a plug-in connection.

15. The securing system in accordance with claim 14, wherein plug-in elements of said plug-in connection on a side of said base body are clamped together with plug-in elements of said plug-in connection of a side of said mounting base when said clamping element has been pivoted into a position in which said eccentric surface is in engagement with said support body.

16. The securing device in accordance with claim 1, wherein said clamping element comprises an actuating section for manually pivoting said clamping element.

17. The securing device in accordance with claim 16, wherein said actuating section is embodied as an elevation of said clamping element.

18. The securing device in accordance with claim 1, wherein said clamping element comprises an actuating section for pivoting said clamping element by a tool.

19. The securing device in accordance with claim 18, wherein said actuating section is arranged on said clamping element in such a way that an assigned tool can be brought into engagement with said actuating section along a direction substantially extending transversely with respect to said displacement direction of said base body.

20. The securing device in accordance with claim 1, further comprising a protrusion arranged on said clamping element in such a way that in the course of pivoting said clamping element, in order to bring said eccentric surface out of engagement with said support body, said protrusion can be brought into contact with said mounting base in such a way that a release force acts on said securing device, which has the tendency of distancing said securing device from said mounting base.

21. The securing device in accordance with claim 1, wherein said base body is seated longitudinally displaceable in said guide track of said support body in such a way that said base body can be brought out of engagement with said guide track by pivot movement in a plane defined by said guide track and can be removed from said support body in a direction perpendicularly with respect to said displacement direction.

22. The securing device in accordance with claim 21, wherein a guide element of said base body has a beveled flank for being able to bring said guide element out of engagement with said guide track by movement of said base body with a component perpendicularly with respect to said displacement direction.

23. The securing device in accordance with claim 9, wherein said securing device and said guide element are coupled with each other by a coupling element longitudinally extending along said mounting base, so that said securing device and said guide element can be shifted together along said support body when said eccentric surface of said clamping element is out of engagement with said support body.

24. The securing device in accordance with claim 23, wherein said coupling element can be releasably fixed in place on said securing device, as well as on said guide element.

25. A measuring instrument for the determination of the position of two components which are movable in relation to each other, said measuring instrument comprising:
- a linearly extending measuring graduation;
- a support body comprising a guide track and supporting said measuring graduation;
- a scanning device scanning said measuring graduation, which is movably guided along said measuring graduation;
- a mounting base for fastening said scanning device; and
- a securing device comprising:
  - a base body, which is longitudinally displaceable along said guide track of said support body and can be fixed in place on said support body by clamping forces in order to maintain said mounting base in a desired position in regard to said support body; and
  - a clamping element pivotably seated on said base body about a pivot axis, which has an eccentric surface, which is embodied to be eccentric with respect to said pivot axis, and that, by pivoting said clamping element, said eccentric surface can be brought into engagement with said support body in such a way that, in the course of pivoting of said clamping element, said base body is fixed in place on said support body and can be brought into a state in which it is displaceably seated on said support body.

26. The measuring instrument in accordance with claim 25, wherein said base body is clamped in place on said support body when said clamping element has been pivoted into a position in which said eccentric surface of said clamping element is in engagement with said support body, wherein said eccentric surface of said clamping element presses against said support body in such a way that said base body is clamped in place against said support body as a result of reaction forces connected with such pressing.

27. The measuring instrument in accordance with claim 25, wherein said base body can be shifted along said support body when said clamping element has been pivoted into a position in which said eccentric surface of said clamping element is out of engagement with said support body.

28. The measuring instrument in accordance with claim 25, wherein said base body has at least one guide element conducted in said guide track, which can be clamped in place against a protrusion delimiting said guide track.

29. The measuring instrument in accordance with claim 25, wherein said base body is connected with said mounting base by a plug-in connection.

30. The measuring instrument in accordance with claim 29, wherein plug-in elements of said plug-in connection on a side of said base body are clamped together with plug-in elements of said plug-in connection of a side of said mounting base when said clamping element has been pivoted into a position in which said eccentric surface is in engagement with said support body.

31. The measuring instrument in accordance with claim 25, wherein said clamping element comprises an actuating section for manually pivoting said clamping element.

32. The measuring instrument in accordance with claim 31, wherein said actuating section is embodied as an elevation of said clamping element.

33. The measuring instrument in accordance with claim 25, wherein said clamping element comprises an actuating section for pivoting said clamping element by a tool.

34. The measuring instrument in accordance with claim 33, wherein said actuating section is arranged on said clamping element in such a way that an assigned tool can be brought into engagement with said actuating section along a direction substantially extending transversely with respect to said displacement direction of said base body.

35. The measuring instrument in accordance with claim 25, further comprising a protrusion arranged on said clamping element in such a way that in the course of pivoting said clamping element, in order to bring said eccentric surface out of engagement with said support body, said protrusion can be brought into contact with said mounting base in such a way that a release force acts on said securing device, which has the tendency of distancing said securing device from said mounting base.

36. The measuring instrument in accordance with claim 25, wherein said securing device and said guide element are coupled with each other by a coupling element longitudinally extending along said mounting base, so that said securing device and said guide element can be shifted together along said support body when said eccentric surface of said clamping element is out of engagement with said support body.

* * * * *